United States Patent
Nakajima et al.

[11] Patent Number: 5,831,488
[45] Date of Patent: Nov. 3, 1998

[54] DIGITAL PHASE MODULATOR FORMED WITH A FIXED-POINT DIGITAL SIGNAL PROCESSOR

[75] Inventors: Michio Nakajima, Osaka; Weimin Sun, Kunitati, both of Japan

[73] Assignee: Icom Incorporated, Osaka, Japan

[21] Appl. No.: 801,728

[22] Filed: Jun. 27, 1996

[30] Foreign Application Priority Data

Jan. 22, 1996 [JP] Japan ................................ 8-008322

[51] Int. Cl.$^6$ ........................................................ H03C 3/00
[52] U.S. Cl. .......................... 332/144; 364/729; 455/110
[58] Field of Search ............................ 332/117, 144–148; 364/729, 730; 455/110

[56] References Cited

U.S. PATENT DOCUMENTS 4,646,321  2/1987  Berlinsky ............................ 332/109 X
4,660,162  4/1987  Berlinsky ............................ 332/109 X Primary Examiner—David Mis
Attorney, Agent, or Firm—Frishauf, Holtz, Goodman, Langer & Chick

[57] ABSTRACT

Data from an A/D converter is supplied to a fixed-point DSP. The fixed-point DSP adjusts the level of the data x so that computed results do not exceed ±1. In succession, for the i-th data $x_i$, the fixed-point DSP computes $\cos \pi \cdot x_i$ when i=1, 5, . . . , $-\sin \pi \cdot x_i$ when i=2, 6, . . . , $-\cos \pi \cdot x_i$ when i=3, 7, . . . and $\sin \pi \cdot x_i$ when i=4, 8, . . . and outputs a digital phase modulated signal y(t) by outputting the computed results in order. Trigonometrical functions are computed by expanding them to a series so that the intermediate computed results do not exceed ±1.

21 Claims, 1 Drawing Sheet

DIGITAL PHASE MODULATOR FORMED WITH A FIXED-POINT DIGITAL SIGNAL PROCESSOR

BACKGROUND OF THE INVENTION

1. Field of the Invention

The present invention relates to a digital phase modulator using a fixed-point digital signal processor (DSP).

2. Description of the Related Art

The phase modulation (Frequency Modulation; FM) of an analog signal processing system has been widely used. Further, any number of digital signal process phase modulations have been proposed with the development of digital signal processing technology in recent years.

Digital signal processors (DSP) which have been developed and widely used in recent years are broadly divided into processors adopting fixed-point representation (Fixed-point DSP) and processors adopting floating-point representation (Floating-point DSP).

The range of data that can be represented by a fixed-point DSP is restricted (normally, from −1 to +1) as the data that can be processed is in limited bit length. If the data value is in excess of this representable range, overflow or underflow may occur and correct computed results cannot be obtained. Therefore, a ROM table for computation of trigonometrical functions has been used even when a floating-point DSP or a fixed-point DSP has been adopted.

Problems caused by using a fixed-point DSP will now be explained with reference to equations.

First, when an input signal that is input to a DSP after analog/digital conversion is assumed as S(t), it is given by equation (1):

$$S(t) = A \cdot \sin(2 \cdot \pi \cdot f \cdot t) \text{ where, } A \leq 1 \qquad (1)$$

The signal SFM after phase modulation is expressed by equation (2):

$$\begin{aligned} SFM &= \sin(2 \cdot \pi \cdot f_c \cdot t + (f_d/f) \cdot A \cdot \sin(2 \cdot \pi \cdot f \cdot t)) \\ &= \sin(2 \cdot \pi \cdot f_c \cdot t + k \cdot A \cdot \sin(2 \cdot \pi \cdot f \cdot t)) \end{aligned} \qquad (2)$$

where, $f_c$ is carrier frequency, $f_d$ is maximum frequency deviation, and k is a constant (system coefficient) which is determined by maximum frequency deviation $f_d$ and modulation frequency f and is expressed by $k = f_d/f$.

As described above, a fixed-point DSP is capable of handling only numerical values within the range from −1 to +1. So in order to process (2) by a fixed-point DSP, not only $\sin(2 \cdot \pi \cdot f_c \cdot t + k \cdot A \cdot \sin(2 \cdot \pi \cdot f \cdot t))$ should be within the range of −1 to +1 but also $k \cdot A \cdot \sin(2 \cdot \pi \cdot f \cdot t)$ must be in the range of −1 to +1. However, there is the possibility that $k \cdot A > 1$, $k \cdot A \sin(2 \cdot \pi \cdot f \cdot t)$ is not always in the range of −1 to +1. So the fixed-point DSP could not simply perform the signal processing.

Therefore, a complicated computation of the trigonometrical function is needed to confine input signals within the range (−1 to +1) that can be handled by a fixed-point DSP.

To obtain computed results of the trigonometrical function quickly and easily, it is proposed that an exclusive ROM storing a table with computed results of the trigonometrical functions and the ROM is addressed by an input signal to read out the computed results. In this case, however, accuracy of computation relates to table size; therefore, a ROM with a large storage capacity is required in order to obtain highly accurate modulation signals.

When the floating-point DSP is used, it is possible to process signals without being governed by input signal values but a complicated process becomes necessary. Further, there is also the problem that the floating-point DSP is more expensive than the fixed-point DSP. Therefore, a digital phase modulator using a floating-point DSP also becomes expensive.

SUMMARY OF THE INVENTION

The present invention has been made in view of the above considerations and it is an object to provide a digital phase modulator which is capable of easily performing trigonometrical functional computations using a fixed-point DSP and furthermore, requiring less storage area in a ROM to be used.

Further, it is another object of the present invention to provide a highly precise digital phase modulator with a simple structure.

To achieve the objects, a digital phase modulator (FM) of the first aspect of the present invention comprises:

level adjusting means for adjusting values of digital data included in a digital input signal according to a constant determined by a maximum frequency deviation and a modulation frequency so that absolute values of the digital data do not exceed 1;

computing means for computing respective one of a positive cosine, a negative sine, a negative cosine, and a positive sine of the digital data sequentially supplied from said level adjusting means so that absolute values of intermediate results of computation do not exceed 1; and modulating means for phase-modulating the level-adjusted signal by selecting and outputting the sine and the cosine computed by said computing means.

Further, a digital phase modulator (FM) of the second aspect of the present invention wherein said fixed-point digital signal processor comprising:

level adjusting means for adjusting a level of the input signal in accordance with a constant determined by a maximum frequency deviation and a modulation frequency;

computing means for computing sine and cosine of the signal level-adjusted by said level adjusting mean; and modulating means for modulating the level-adjusted signal and outputting a modulated signal whose phase is modulated to the input signal by superposing the sine and cosine computed by said computing means.

Further, a digital phase modulator (FM) of the third aspect of the present invention wherein said fixed-point digital signal processor comprising:

level-adjusting means for adjusting levels of input signal x to satisfy equation (3), and outputting level-adjusted signal data; and computing means for obtaining a positive cosine $(\cos \cdot \pi \cdot x)$ when the level-adjusted signal data is $((4 \cdot n)-3)$-th data, for obtaining a negative sine $(-\sin \cdot \pi \cdot x)$ when the level-adjusted signal data is $((4 \cdot n)-2)$-th data, for obtaining a negative cosine $(-\cos \cdot \pi \cdot x)$ when the level-adjusted signal data is $((4 \cdot n)-1)$-th data, and for obtaining a positive sine $(\sin \cdot \pi \cdot x)$ when the level-adjusted signal data is $(4 \cdot n)$-th data, and selecting and outputting the obtained results in order.

$$x = (k \cdot A/\pi) \cdot \sin(2 \cdot \pi \cdot f \cdot t) + 2 \cdot m \qquad (3)$$

where, k and A denote constants, π is the circular constant, f is the modulation frequency, t is time, m is an integer satisfies equation (4).

$$-p \leq m \leq p, \; p < [k/(2 \cdot \pi)+1] \qquad (4)$$

where, $[k/(2 \cdot \pi)+1]$ represents the maximum integer not exceeding $(k/(2 \cdot \pi)+1)$ According to digital phase modulators involved in the first to third aspects of the present invention, it becomes possible to confine input signals, intermediate computing results and final computing results to the range of −1 to +1, so processing by a fixed-point DSP becomes possible.

DETAILED DESCRIPTION OF THE PREFERRED EMBODIMENT

A digital phase modulator (FM) according to a preferred embodiment of the present invention will be described.

Figure 1:
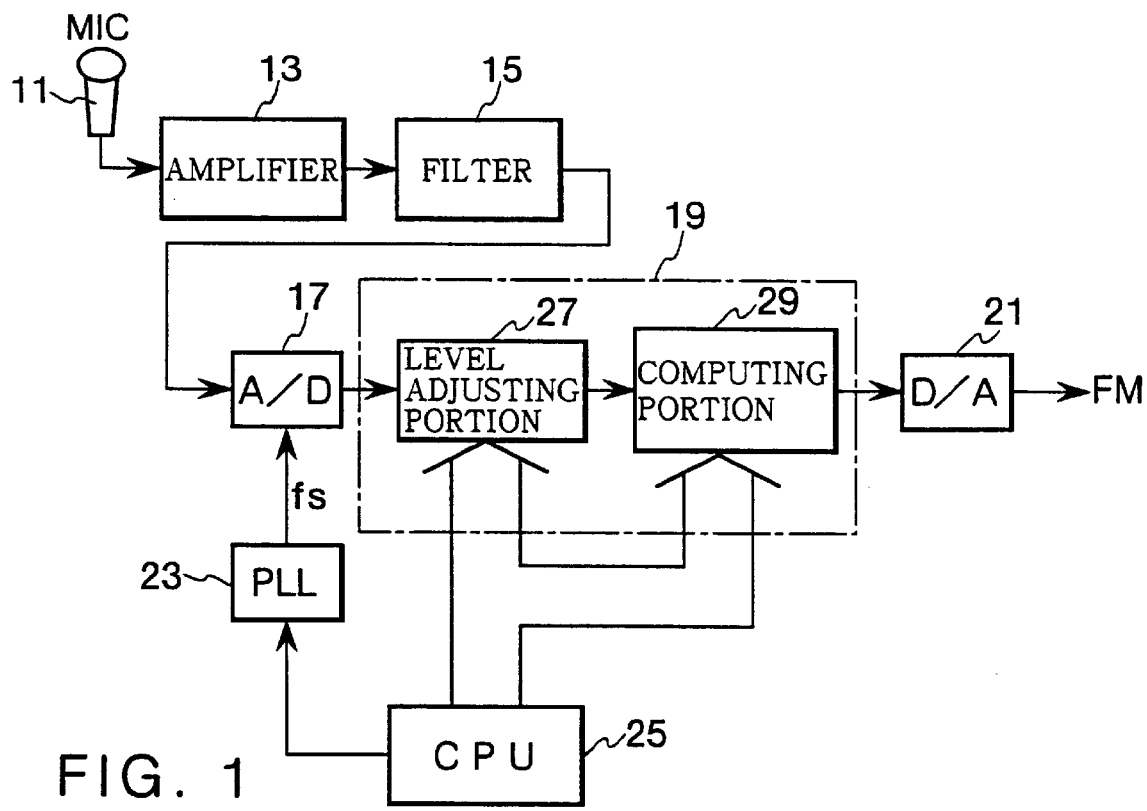
FIG. 1 is a block diagram showing the configuration of a digital phase modulator according to the preferred embodiment of the present invention.

As shown in FIG. 1, this digital phase modulator includes a microphone 11 to convert an audio signal into an electric signal; an amplifier 13 to amplify the signal output from the microphone 11; a filter 15 to cut unnecessary components of the output of the amplifier 13; an A/D converter 17 to sample a signal passed through the filter 15 using a specified sampling frequency $f_s$ and convert it to digital data; a fixed-point DSP 19 to modulate the phase of the digital signal output from the A/D converter 17; a D/A converter 21 to convert the modulated signal SFM output from the fixed-point DSP 19 to an analog signal; a PLL circuit 23; and a CPU 25.

The fixed-point DSP 19 includes a level adjusting portion 27 which adjusts input signal levels and a computing portion 29 which computes the trigonometrical functions to phase-modulate the level-adjusted signal supplied from the level adjusting portion 27.

The level adjusting portion 27 adjusts input signal levels by adjusting input data values so that input signals can be processed in the computing portion 29 at the succeeding stage.

Figure 2:
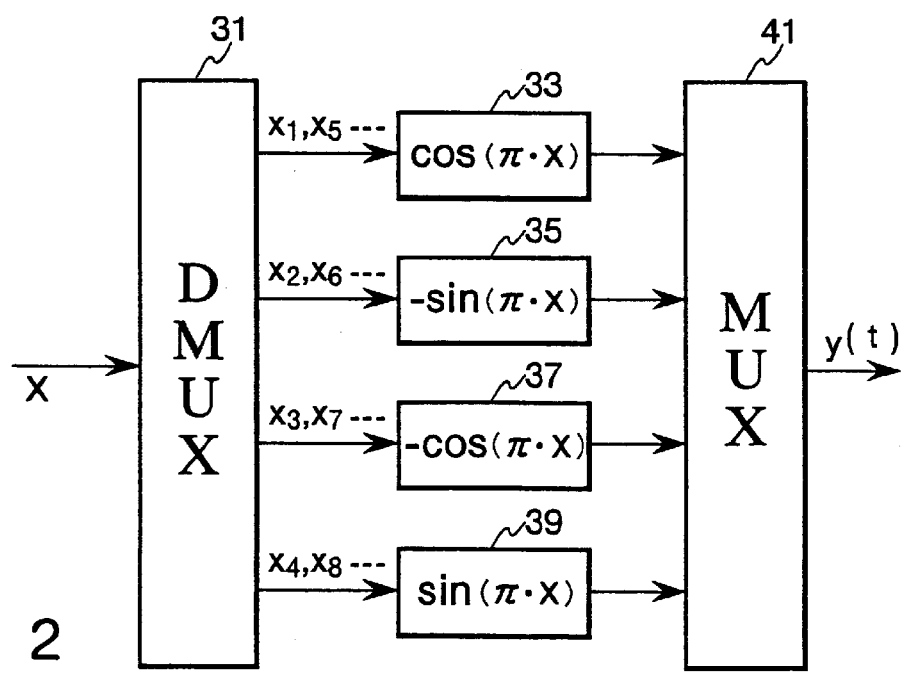
FIG. 2 is a block diagram showing the configuration of a computing portion shown in FIG. 1.

The computing portion 29 includes a demultiplexer 31 which sequentially (cyclically) outputs the level-adjusted signal to four output terminals; a first cosine computing portion 33 which computes the cosine (cos) of each piece of data output to the first output terminal of the demultiplexer 31; a first sine computing portion 35 which computes the negative sine (−sin) of each piece of data output to the second output terminal of the demultiplexer 31; a second cosine computing portion 37 which computes the negative cosine (−cos) of each piece of data output to the third output terminal of the demultiplexer 31; a second sine computing portion 39 which computes the sine (sin) of each piece of data output to the fourth output terminal of the demultiplexer 31; and a multiplexer 41 which multiplexes (outputs by selecting in order) the outputs of the computing portions 33 to 39 as shown in FIG. 2.

Each of the computing portions 33 to 39 expands cosines and sines to series and compute them so that the absolute values of the computed results (including intermediate results) do not exceed 1.

Next, the operation of the digital phase modulator will be explained.

Signal output from the microphone 11 is amplified in the amplifier 13, unnecessary components of the signal are cut by the filter 15, and the filtered signal is supplied to the A/D converter 17.

The A/D converter 17 samples and converts the input analog signal to a digital signal in response to a sampling clock signal supplied from the PLL circuit 23 and supplies them to the fixed-point DSP 19. The frequency $f_s$ of the sampling clock signal output from the PLL circuit 23 has been set at four times the carrier frequency $f_c$ ($f_s = 4 \cdot f_c$) by the control of the CPU 25.

The output signal S(t) of the A/D converter 17 is expressed by equation (5):

$$S(t) = A \cdot \sin(2 \cdot \pi \cdot f \cdot t) \qquad (5)$$

where, A is an amplitude and $A \leq 1$.

The level adjusting portion 27 generates data x which is expressed by equation (6) by multiplying the supplied output signal S(t) with a coefficient k/π set by the CPU 25 and further, adding 2·m.

$$x = (k \cdot A/\pi) \cdot \sin(2 \cdot \pi \cdot f \cdot t) + 2 \cdot m \qquad (6)$$

where, k is a system coefficient determined by the maximum frequency deviation $f_d$ and the modulation frequency f and is expressed by equation (7).

$$k = f_d / f \qquad (7)$$

Further, m is an integer introduced to satisfy equations (8) and (9).

$$-\pi \leq k \cdot A \cdot \sin(2 \cdot \pi \cdot f \cdot t) + 2 \cdot m \cdot \pi < \pi \qquad (8)$$

$$-p \leq m \leq p$$

$$p < [k/(2 \cdot \pi)+1] \qquad (9)$$

where, $[k/(2 \cdot \pi)+1]$ indicates a maximum integer which does not in exceed of $(k/(2 \cdot \pi)+1)$.

When equation (8) is multiplied with 1/π, equation (10) holds good. Accordingly, data x shown by equation (6) becomes a value within the range of $-1 \leq x < +1$ which can be processed by the fixed-point DSP 19.

$$-1 \leq (k \cdot A/\pi) \cdot \sin(2 \cdot \pi \cdot f \cdot t) + 2 \cdot m < 1 \qquad (10)$$

The level-adjusted signal output from the level adjusting portion 27 is supplied to the computing portion 29.

In this embodiment, the data x is determined to satisfy equation (11) according to the system coefficient k and the constant m.

$$\begin{aligned}
&x = (k/\pi) \cdot A \cdot \sin(2 \cdot \pi \cdot f \cdot t), \\
&\quad \text{when } -(1/k) \leq (A/\pi) \cdot \sin(2 \cdot \pi \cdot f \cdot t) < (1/k); \\
&x = ((A/\pi) \cdot \sin(2 \cdot \pi \cdot f \cdot t) - (2/k)) \cdot k, \\
&\quad \text{when } (1/k) \leq (A/\pi) \cdot \sin(2 \cdot \pi \cdot f \cdot t) < (3/k); \\
&x = ((A/\pi) \cdot \sin(2 \cdot \pi \cdot f \cdot t) + (2/k)) \cdot k, \\
&\quad \text{When } -(3/k) \leq (A/\pi) \cdot \sin(2 \cdot \pi \cdot f \cdot t) < -(1/k); \\
&\ldots \\
&x = ((A/\pi) \cdot \sin(2 \cdot \pi \cdot f \cdot t) - (2 \cdot m/k)) \cdot k,
\end{aligned} \qquad (11)$$

-continued when $((2 \cdot m - 1)/k) \leq (A/\pi) \cdot \sin(2 \cdot \pi \cdot f \cdot t) < ((2 \cdot m + 1)/k)$.

The phase modulated output SFM is expressed by equation (12) using the data x.

$$
\begin{aligned}
SFM &= \sin(2 \cdot \pi \cdot f_c \cdot t + k \cdot A \cdot \sin(2 \cdot \pi \cdot f \cdot t)) \\
&= \sin(2 \cdot \pi \cdot f_c \cdot t + \pi \cdot (k/\pi) \cdot A \cdot \sin(2 \cdot \pi \cdot f \cdot t)) \\
&= \sin(2 \cdot \pi \cdot f_c \cdot t + \pi \cdot (k/\pi) \cdot A \cdot \sin(2 \cdot \pi \cdot f \cdot t) + 2 \cdot m \cdot \pi) \\
&= \sin(2 \cdot \pi \cdot f_c \cdot t + \pi \cdot ((k/\pi) \cdot A \cdot \sin(2 \cdot \pi \cdot f \cdot t) + 2 \cdot m)) \\
&= \sin(2 \cdot \pi \cdot f_c \cdot t + \pi \cdot x)
\end{aligned} \quad (12)
$$

As the sampling frequency $f_s$ of the A/D converter 17 has been set at four times ($f_s = 4 \cdot f_c$) of the carrier frequency $f_c$, equation (12) can be rewritten to give equation (13). Further, $t_1, t_2, t_3, \ldots$ represent sampling timings and $x_1, x_2, x_3 \ldots$ represent data $x$ ($= k \cdot A \cdot \sin(2 \cdot \pi \cdot f \cdot t)$) at each sampling timing.

$$
\begin{aligned}
t_1 &= 1/f_s = 1/(4 \cdot f_c) \\
t_2 &= 2/f_s = 2/(4 \cdot f_c) \\
&\ldots \\
t_i &= i/fs = i/(4 \cdot f_c) \\
SFM &= \sin(2 \cdot \pi \cdot f_c \cdot t + \pi \cdot x) \\
&= \{\sin(2 \cdot \pi \cdot f_c \cdot (1/(4 \cdot f_c)) + \pi \cdot x_1), \\
&\quad \sin(2 \cdot \pi \cdot f_c \cdot (2/(4 \cdot f_c)) + \pi \cdot x_2), \\
&\quad \sin(2 \cdot \pi \cdot f_c \cdot (3/(4 \cdot f_c)) + \pi \cdot x_3), \ldots \\
&\quad \sin(2 \cdot \pi \cdot f_c \cdot (i/(4 \cdot f_c)) + \pi \cdot x_i), \ldots \} \\
&= \{\sin((\pi/2) + \pi \cdot x_1), \sin(\pi + \pi \cdot x_2), \\
&\quad \sin((3 \cdot \pi/2) + \pi \cdot x_3), \ldots \\
&\quad \sin((i \cdot \pi/2) + \pi \cdot x_i), \ldots \} \\
&= \{\cos(\pi \cdot x_1), -\sin(\pi \cdot x_2), -\cos(\pi \cdot x_3), \\
&\quad \sin(\pi \cdot x_4), \cos(\pi \cdot x_5), -\sin(\pi \cdot x_6), \ldots \}
\end{aligned} \quad (13)
$$

That is, the phase modulated output SFM can be obtained by computing the cosine of the data $x_i$ when the data $x_i$ is $((4 \cdot n) - 3)$-th data, the negative sine of the data $x_i$ when the data $x_i$ is $((4 \cdot n) - 2)$-th data, the negative cosine of the data $x_i$ when the data $x_i$ is $((4 \cdot n) - 1)$-th data, the sine of the data $x_i$ when the data $x_i$ is $(4 \cdot n)$-th data; and outputs the obtained results in order, wherein n is a positive integer.

In order to perform such computations, the demultiplexer 31 supplies the first input data $x_1 = k \cdot A \cdot \sin(2 \cdot \pi \cdot f \cdot t_1)$ to the first cosine computing portion 33 through the first output terminal; the second input data $x_2 = k \cdot A \cdot \sin(2 \cdot \pi \cdot f \cdot t_2)$ to the first sine computing portion 35 through the second output terminal; the third input data $x_3 = k \cdot A \cdot \sin(2 \cdot \pi \cdot f \cdot t_3)$ to the second cosine computing portion 37 through the third output terminal; the fourth input data $x_4 = k \cdot A \cdot \sin(2 \cdot \pi \cdot f \cdot t_4)$ to the second sine computing portion 39 through the fourth output terminal; the fifth input data $x_5 = k \cdot A \cdot \sin(2 \cdot \pi \cdot f \cdot t_5)$ to the first cosine computing portion 33 through the first output terminal; the sixth input data $x_6 = k \cdot A \cdot \sin(2 \cdot \pi \cdot f \cdot t_6)$ to the first sine computing portion 35 through the second output terminal, cyclically.

The first cosine computing portion 33 computes the positive cosine ($\cos(\pi \cdot x)$) of the products which are obtained by multiplying data $x_1, x_5 \ldots$ from the first output terminal with the circular constant $\pi$. The first sine computing portion 35 computes the negative sine ($-\sin(\pi \cdot x)$) of the products which are obtained by multiplying data $x_2, x_6 \ldots$ from the second output terminal with the circular constant $\pi$. The second cosine computing portion 37 computes the negative cosine ($-\cos(\pi \cdot x)$) of the products which are obtained by multiplying data $x_3, x_7 \ldots$ from the third output terminal with the circular constant $\pi$. The second sine computing portion 39 computes the positive sine ($\sin(\pi \cdot x)$) of the products which are obtained by multiplying data $x_4, x_8 \ldots$ from the fourth output terminal with the circular constant $\pi$.

During the course of computation by the computing portions 33 to 39, if any value exceeds the range of $-1$ to $+1$, even tentatively, the fixed-point DSP 19 cannot process it.

Therefore, the computing portions 33 to 39 express $\sin(\pi \cdot x)$ and $\cos(\pi \cdot x)$ by a sum of a series and perform the sine and cosine computations according to the series computation.

This series computation will now be explained.

If $\sin(x \cdot \pi)$ is expressed by a sum of a series, it will become almost as shown by equation (14). Further, coefficients become values shown in equation (15).

$$
\begin{aligned}
\sin(x \cdot \pi) &\approx x \cdot \pi - (x \cdot \pi)^3/(3!) + (x \cdot \pi)^5/(5!) - (x \cdot \pi)^7/(7!) + \\
&\quad (x \cdot \pi)^9/(9!) - (x \cdot \pi)^{11}/(11!) \\
&= x \cdot \pi (1 - (\pi^2 \cdot x^2)/(3!) + (\pi^4 \cdot x^4)/(5!) - (\pi^6 \cdot x^6)/(7!) + \\
&\quad (\pi^8 \cdot x^8)/(9!) - (\pi^{10} \cdot x^{10})/(11!))
\end{aligned} \quad (14)
$$

$$
\begin{aligned}
\pi^2/(3!) &= 1.64493 = (1 + 0.64493) \\
\pi^4/(5!) &= 0.81175 \\
\pi^6/(7!) &= 0.19075 \\
\pi^8/(9!) &= 0.02615 \\
\pi^{10}/(11!) &= 0.00235 \\
\pi &= 0.7854 \cdot 2^2
\end{aligned} \quad (15)
$$

When an operation is performed with a coefficient whose absolute value excesses 1, the operation is performed by dividing the coefficient into two value less than 1. Further, it may be necessary to change the order of computation in order to prevent computed results from exceeding $\pm 1$ during the computation. In this embodiment, therefore, the first and the second sine computing portions 35 and 39 perform the series computation in order according to equation (16).

$$
\sin(x \cdot \pi) = (1 - x^2 + 0.81175 \cdot x^4 - 0.19075 \cdot x^6 + 0.02615 \cdot x^8 - 0.00235 \cdot x^{10} - 0.64493 \cdot x^2) \cdot x \cdot \pi \quad (16)
$$

In equation (16), because a coefficient of $x^2$ is in exceeds of $-1$, a product of $x^2$ with the coefficient was computed by dividing it into two parts. Further, a part of the computation relative to $x^2$ was moved in the last term so that the intermediate computed result did not exceed $\pm 1$.

Thus, the sine computation can be achieved by the fixed point DSP 19.

On the other hand, $\cos(\pi \cdot x)$ can be rewritten as shown in equation (17).

$$
\begin{aligned}
\cos(\pi \cdot x) &= \sin(\pi \cdot (x + (1/2))) \text{ where } x < 1/2 \\
\cos(\pi \cdot x) &= \sin(\pi \cdot (x - (3/2))) \text{ where } x \geq 1/2
\end{aligned} \quad (17)
$$

So, the first and the second cosine computing portions 33 and 37 determine whether the data x supplied from the demultiplexer 31 is less than ½, or equal to, or more than ½. If x<½, they perform the series computation according to equation (18) and if x≥½, perform the series computation according to equation (19).

$$
\begin{aligned}
\cos(\pi \cdot x) &= \sin(\pi \cdot (x + (1/2))) \\
&= (1 - (x + (1/2))^2 + 0.81175 \cdot (x + (1/2))^4 - \\
&\quad 0.19075 \cdot (x + (1/2))^6 + 0.02615 \cdot (x + (1/2))^8 - \\
&\quad 0.00235 \cdot (x + (1/2))^{10} - \\
&\quad 0.64493 \cdot (x + (1/2))^2) \cdot (x + (1/2)) \cdot \pi -
\end{aligned} \quad (18)
$$

$$\begin{aligned}
\cos(\pi \cdot x) &= \sin(\pi \cdot (x - (3/2))) \quad (19)\\
&= (1 - (x - (3/2))^2 + 0.81175 \cdot (x - (3/2))^4 - \\
&\quad 0.19075 \cdot (x - (3/2))^6 + 0.02615 \cdot (x - (3/2))^8 - \\
&\quad 0.00235 \cdot (x - (3/2))^{10} - \\
&\quad 0.64493 \cdot (x - (3/2))^2) \cdot (x - (3/2)) \cdot \pi
\end{aligned}$$

Thus, it is possible to compute the sine and cosine by expanding them to series and further, changing the order of the computation by dividing the computation of coefficients in excess of ±1 so that the intermediate computed results do not exceed 1. Accordingly, it becomes possible to make the computation of the sine and cosine by the fixed-point DSP 19.

The multiplexer 41 selects and outputs the computed results of the computing portions 33 to 39 by one sampling clock period in order.

Therefore, the output y(t) of the multiplexer 41 will become as shown in equation (20).

$$\begin{aligned}
y(t) &= \{\cos(\pi \cdot x_1), -\sin(\pi \cdot x_2), -\cos(\pi \cdot x_3), \quad (20)\\
&\quad \sin(\pi \cdot x_4), \cos(\pi \cdot x_5), -\sin(\pi \cdot x_6), \ldots \}
\end{aligned}$$

The output y(t) shown in equation (20) is equivalent to the phase modulated output SFM shown in equation (13). It can be seen that the phase of the input signal S(t) was modulated.

By converting this signal to an analog phase modulated signal by the D/A converter 21, it is possible to obtain an analog phase modulated signal.

According to the configuration described above, the computations in the level adjusting portions 27 and the computing portion 29 are all performed within the range of −1 to +1. Therefore, this configuration can be achieved using the fixed-point DSP 19.

Further, the capacity of a ROM is sharply smaller than the ROM table which is seed for computing the trigonometrical function, since only coefficients for computation are stored in the ROM or the like.

Next, a method of obtaining level-adjusted input data x will be explained based on an example.

The system coefficient k is determined by the maximum frequency deviation $f_d$ and the modulation frequency f. Here, the maximum frequency deviation $f_d$ is set at 4.8 kHz and the modulation frequency f at 300 Hz, resulting in k=16. In this case, from equations (8) and (9), m=−3, −2, −1, 0, 1, 2, and 3.

Therefore, x is determined as shown in equation (21):

$$\begin{aligned}
&x = (16/\pi) \cdot A \cdot \sin(2 \cdot \pi \cdot f \cdot t), \quad (21)\\
&\text{when } -(1/16) \leq (A/\pi) \cdot \sin(2 \cdot \pi \cdot f \cdot t) < (1/16) \text{ (when } m = O\text{);}\\
&x = ((A/\pi) \cdot \sin(2 \cdot \pi \cdot f \cdot t) - (1/8)) \cdot 16,\\
&\text{when } (1/16) \leq (A/\pi) \cdot \sin(2 \cdot \pi \cdot f \cdot t) < (3/16) \text{ (when } m = -1\text{);}\\
&x = ((A/\pi) \cdot \sin(2 \cdot \pi \cdot f \cdot t) + (1/8)) \cdot 16,\\
&\text{when } -(3/16) \leq (A/\pi) \cdot \sin(2 \cdot \pi \cdot f \cdot t) < -(1/16) \text{ (when } m = 1\text{);}\\
&x = ((A/\pi) \cdot \sin(2 \cdot \pi \cdot f \cdot t) - (1/4)) \cdot 16,\\
&\text{When } (3/16) \leq (A/\pi) \cdot \sin(2 \cdot \pi \cdot f \cdot t) < (5/16) \text{ (when } m = -2\text{);}\\
&x = ((A/\pi) \cdot \sin(2 \cdot \pi \cdot f \cdot t) + (1/4)) \cdot 16,\\
&\text{When } -(5/16) \leq (A/\pi) \cdot \sin(2 \cdot \pi \cdot f \cdot t) < -(3/16) \text{ (when } m = 2\text{);}\\
&x = ((A/\pi) \cdot \sin(2 \cdot \pi \cdot f \cdot t) - (3/8)) \cdot 16,\\
&\text{When } (5/16) \leq (A/\pi) \cdot \sin(2 \cdot \pi \cdot f \cdot t) < (7/16) \text{ (when } m = -3\text{);}\\
&\text{and}\\
&x = ((A/\pi) \cdot \sin(2 \cdot \pi \cdot f \cdot t) + (3/8)) \cdot 16,\\
&\text{When } -(7/16) \leq (A/\pi) \cdot \sin(2 \cdot \pi \cdot f \cdot t) < -(5/16) \text{ (when } m = 3\text{).}
\end{aligned}$$

As explained above, according to this embodiment, the computations in the level adjusting portion 27 and the computing portion 29 are all performed within the range of −1 to +1. Therefore, these configurations can be provided of using the fixed-point DSP 19.

Further, data stored in a ROM is only computation coefficients. Therefore, the capacity of a ROM can be reduced sharply comparing with a ROM storing the table for computing the trigonometrical function. In addition, it is also possible to improve computing accuracy by improving the accuracy of the coefficients.

Further, the present invention is not limited to the embodiment described above but may be used in various modified forms and applications. For instance, the embodiment described above shows the configuration where in the demultiplexer 31 distributes input data to four computing portions 33 to 39 and the multiplexer 41 superposes (reconstruct) the computed results but the present invention is not limited to such a configuration. For instance, whenever the data x is supplied from the level adjusting portion 27, one of the computations of cos(π·x), −sin(π·x), −cos(π·x) and sin(π·x) is performed and the result may be directly output.

Further, the first and the second cosine computing portions 33 and 37, and the first and the second sine computing portions 35 and 39 may be consolidated into one computing portion respectively, and the sign (+ or −) of the computing outputs may be changed accordingly.

In addition, FIGS. 1 and 2 show the configuration of the level adjusting portion 27 and the computing portion 29 in the fixed-point DSP 19 and further, the demultiplexer 31, the computing portions 33 to 39, the multiplexer 41, etc. These components may be either as hardware or software. That is, provided that the illustrated functions can be achieved, definite means and techniques to achieve them are optionally adopted.

As described above, according to the present invention, it is possible to confine the intermediate results of computation within a specified range (±1) and construct a phase modulator using a fixed-point digital signal processor.

Further, a small capacity memory is sufficient to store coefficients and other data required for computation.

What is claimed is:

1. A digital phase modulator comprising:

level adjusting means for adjusting values of digital data included in a digital input signal according to a constant determined by a maximum frequency deviation and a modulation frequency so that absolute values of the digital data do not exceed 1;

computing means for computing respective one of a positive cosine, a negative sine, a negative cosine, and a positive sine of the digital data sequentially supplied from said level adjusting means so that absolute values of intermediate results of computation do not exceed 1; and modulating means for generating phase modulated signals of the digital input signal by sequentially outputting values computed by said computing means.

2. A digital phase modulator according to claim 1, wherein, said computing means includes means for computing cosines and sines of data supplied from said level adjusting means using a series.

3. A digital phase modulator according to claim 1, wherein, said computing means includes:

means for outputting data x sequentially supplied from said level adjusting means via first to fourth terminals; and computer means for obtaining the positive cosine of the data output from the first terminal, for obtaining the negative sine of the data output from the second terminal, for obtaining the negative cosine of the data output from the third terminal, for obtaining the positive sine of the data output from the fourth terminal, and for selecting and outputting the computed results in order.

4. A digital phase modulator according to claim 1, wherein, i-th data of level-adjusted signal output from said level adjusting means is represented by $x_i$, and said computing means obtains the positive cosine of data $x_i$ when the data is $((4\cdot n)-3)$-th data, the negative sine of data $x_i$ when the data is $((4\cdot n)-2)$-th data, the negative cosine of data $x_i$ when the data is $((4\cdot n)-1)$-th data, the positive sine of data $x_i$ when the data is $(4\cdot n)$-th data, and selects and outputs obtained results in order, wherein n is a positive integer.

5. A digital phase modulator according to claim 3, wherein, the i-th data of the level-adjusted signal output from the level adjusting means is represented by $x_i$, and said computing means includes:

demultiplexer means for sequentially outputting data supplied from said level adjusting means to four output terminals;

first computing means for obtaining positive cosine of the data $x_i$ $(i=(4\cdot n)-3)$ output from the first output terminal of said demultiplexer means;

second computing means for obtaining negative sine of the data $x_i$ $(i=(4\cdot n)-2)$ output from the second output terminal of said demultiplexer means;

third computing means for obtaining negative cosine of the data $x_i$ $(i=(4\cdot n)-1)$ output from a third output terminal of said demultiplexer means;

fourth computing means for obtaining sine of the data $x_i$ $(i=(4\cdot n))$ output from a fourth output terminal of said demultiplexer means; and multiplexer means for selecting and outputting obtained results of said first through fourth computing means in order, wherein n is a positive integer.

6. A digital phase modulator according to claim 4, wherein, said computing means includes:

demultiplexer means for outputting data x supplied from said level adjusting means to flour output terminals cyclically;

first computing means for obtaining the cosine of the data $x_i$ $((i=(4\cdot n)-3)$, where n is a positive integer) output from a first output terminal of said demultiplexer means;

second computing means for obtaining the negative sine of the data $x_i$ $(i=(4\cdot n)-2)$ output from a second output terminal of said demultiplexer means;

third computing means for obtaining the negative cosine of the data $x_i$ $(i=(4\cdot n)-1)$ output from a third output terminal of said demultiplexer means;

fourth computing means for obtaining the sine of the data $x_i$ $(i=(4\cdot n))$ output from a fourth output terminal of said demultiplexer means; and multiplexer means for receiving outputs of said first through fourth computing means cyclically and output them as one signal consecutively.

7. A digital phase modulator according to claim 1, further comprising:

means for inputting an analog signal to be subject to phase modulation;

analog-digital converting means for sampling and converting the analog signal to digital data by a sampling frequency which is four times carrier frequency of the analog signal and supply the converted digital data to said level adjusting means; and digital-analog converting means for converting output data of said computing means to an analog signal.

8. A digital phase modulator comprising a fixed-point digital signal processor to modulate a phase of an input signal, wherein said fixed-point digital signal processor includes:

level adjusting means for adjusting a level of the input signal according to a constant which is determined by a maximum frequency deviation and a modulation frequency;

computing means for computing sine and cosine of the level-adjusted signal from said level adjusting means; and modulating means for outputting a modulated signal whose phase is modulated to the input signal by superposing the sine and cosine computed by said computing means.

9. A digital phase modulator according to claim 8, wherein, said computing means includes means for computing the sine and cosine of data supplied from said level adjusting means by expanding the data into a series and calculating the series.

10. A digital phase modulator according to claim 8, wherein, said computing means includes:

means for outputting the data x supplied from said level adjusting means to first through fourth systems cyclically;

means for obtaining the cosine of the data output to the first system;

means for obtaining the negative sine of the data output to the second system;

means for obtaining the negative cosine of the data output to the third system;

means for obtaining the sine of the data output to the fourth system; and means for outputting the results obtained from the first through fourth system in order.

11. A digital phase modulator according to claim 8, wherein, for the i-th data $x_i$ of the data output from said level adjusting means, said computing means obtains the cosine of the data $x_i$ when the data $x_i$ is $((4\cdot n)-3)$-th data, the negative sine of the data $x_i$ when the data $x_i$ is $((4\cdot n)-2)$-th data, the negative cosine of the data $x_i$ when the data $x_i$ is $((4\cdot n)-1)$-th data, the sine of the data $x_i$ when the data $x_i$ is $(4\cdot n)$-th data; and outputs the obtained results in order, wherein n is a positive integer.

12. A digital phase modulator according to claim 10, wherein, said computing means includes:

demultiplexer means for outputting the data x supplied from said level adjusting means to four output terminals cyclically;

first computing means for obtaining the cosine of the data $x_i$ $(i=(4\cdot n)-3$ (n is a positive integer)) output from a first output terminal of said demultiplexer means;

second computing means for obtaining a negative sine of the data $x_i$ $(i=(4\cdot n)-2)$ output from the second output terminal of said demultiplexer means;

third computing means for obtaining a negative cosine of the data $x_i$ $(i=(4\cdot n)-1)$ output from the third output terminal of said demultiplexer means;

fourth computing means for obtaining the sine of the data $x_i$ $(i=(4\cdot n))$ output from the fourth output terminal of said demultiplexer means; and multiplexer for receiving outputs of said first through fourth computing means cyclically and output them consecutively as one signal.

13. A digital phase modulator according to claim 11, wherein, said computing means includes:
   demultiplexer means for outputting the data x supplied from said level adjusting means to four output terminals cyclically;
   first computing means for obtaining the cosine of the data $x_i$ (i=(4·n)−3) output from a first output terminal of said demultiplexer means;
   second computing means for obtaining a negative sine of the data $x_i$ (i=(4·n)−2) output from the second output terminal of said demultiplexer means;
   third computing means for obtaining a negative cosine of the data $x_i$ (i=(4·n)−1) output from the third output terminal of said demultiplexer means;
   fourth computing means for obtaining the sine of the data $x_i$ (i=(4·n)) output from the fourth output terminal of said demultiplexer means; and
   multiplexer for receiving outputs of the first through fourth computing means cyclically and output them consecutively as one signal.

14. A digital phase modulator according to claim 8, further comprising:
   means for inputting an analog signal to be subject to a phase modulation,
   analog/digital converting means for sampling the analog signal using a sampling frequency which is four times of a carrier frequency, convert it to digital data, supplying converted data to said level adjusting means; and
   digital/analog converting means for converting the output data of said computing means to an analog signal.

15. A digital phase modulator comprising:
   level adjusting means for adjusting and outputting an input digital signal data x to satisfy equation (22) and outputting the level-adjusted signal data; and
   computing means, wherein i-th data supplied from said level adjusting means is represented by $x_i$, for obtaining cos π·$x_i$ when the data is ((4·n)−3)-th data, −sin π·$x_i$ when the data is ((4·n)−2)-th data, −cos π·$x_i$ when the data is ((4·n)−1)-th data; and sin π·$x_i$ when the data is (4·n)-th data, and for selecting and outputting computed results in order to obtaining a signal satisfying equation (22), $$x=(k·A/\pi)·\sin(2·\pi·f·t)+2·m \quad (22)$$

where, k and A denote constants, π is the circular constant, f is the modulation frequency, t is time, m is an integer satisfying equation (23), $$-p \leq m \leq p, \quad p<[k/(2·\pi)+1] \quad (23)$$

where, [k/(2·π)+1] represents the maximum integer not exceeding (k/(2·π)+1).

16. A digital phase modulator according to claim 15, wherein, the constant k is defined by equation (24) and the data x is expressed by equation (25), $$k=f_d/f \quad (24)$$

where, $f_d$ is a maximum frequency deviation and f is a modulation frequency, $$x=((A/\pi)·\sin(2·\pi·f·t)-2·m/k)·k,$$

when $$(2·m-1)/k \leq (A/\pi)\sin(2·\pi·f·t)<(2·m+1)/k \quad (25).$$

17. The digital phase modulator according to claim 15, wherein, said computing means includes a series computing means for computing the cos π·x, −sin π·x, −cos π·x and sin π·x by decomposing them into a series and calculating the series.

18. A digital phase modulator according to claim 17, wherein, said series computing means makes the computation by decomposing the absolute values of coefficients of the series in excess of 1 into two portions.

19. A digital phase modulator according to claim 17, wherein, said series computing means includes a means for exchanging an order of computation so that the computed results of the series do not exceed ±1 during computation.

20. A digital phase modulator according to claim 15, wherein, said adjusting means and computing means are composed of a fixed-point digital signal processor.

21. A digital phase modulator which modulates a phase of an input signal and comprises a processor being capable of processing numbers only within a predetermined range, wherein
   said processor includes:
      level adjusting means for adjusting a level of the input signal according to a constant which is determined by a maximum frequency deviation and a modulation frequency;
      computing means for computing sine and cosine of the level-adjusted signal from said level adjusting means; and
      modulating means for outputting a modulated signal whose phase is modulated to the input signal by superposing the sine and cosine computed by said computing means.

* * * * *